(12) United States Patent
Irvine

(10) Patent No.: US 7,942,566 B1
(45) Date of Patent: May 17, 2011

(54) FLY ASH TREATMENT SYSTEM AND METHOD OF USE THEREOF

(75) Inventor: James H. Irvine, Cincinnati, OH (US)

(73) Assignee: Flyashdirect, Ltd., Cincinnati, OH (US)

( * ) Notice: Subject to any disclaimer, the term of this patent is extended or adjusted under 35 U.S.C. 154(b) by 1247 days.

(21) Appl. No.: 11/504,267

(22) Filed: Aug. 15, 2006

Related U.S. Application Data

(63) Continuation-in-part of application No. 11/247,489, filed on Oct. 11, 2005, now abandoned.

(51) Int. Cl.
   *B01F 15/02* (2006.01)

(52) U.S. Cl. ....... 366/11; 366/137; 366/144; 366/160.3; 366/173.1

(58) Field of Classification Search ............. 366/10–11, 366/136–137, 159.1, 162.1, 167.1, 173.1, 366/173.2, 101, 107, 144, 145, 149, 160.2, 366/341, 160.3; 137/563
See application file for complete search history.

(56) References Cited

U.S. PATENT DOCUMENTS

| | | | |
|---|---|---|---|
| 2,900,176 A * | 8/1959 | Krogel | 366/137 |
| 3,164,374 A * | 1/1965 | Ralph | 366/132 |
| 3,784,169 A * | 1/1974 | Bockmann et al. | 425/146 |
| 3,879,021 A | 4/1975 | Riley | |
| 3,976,030 A | 8/1976 | Ragsdale et al. | |
| 4,298,288 A * | 11/1981 | Weisbrod | 366/8 |
| 4,419,135 A | 12/1983 | Hoge | |
| 4,585,353 A * | 4/1986 | Schonhausen | 366/11 |
| 4,801,210 A * | 1/1989 | Gian | 366/156.2 |
| 4,815,860 A * | 3/1989 | Deuse | 366/3 |
| 4,832,497 A | 5/1989 | Wentzel | |
| 4,948,429 A | 8/1990 | Arfaei | |
| 5,080,022 A | 1/1992 | Carlson | |
| 5,252,636 A | 10/1993 | Ellenberger et al. | |
| 5,286,292 A | 2/1994 | Tsukada et al. | |
| 5,308,159 A * | 5/1994 | Misuraca | 366/173.1 |
| 5,456,751 A | 10/1995 | Zandi et al. | |
| 5,536,310 A | 7/1996 | Brook et al. | |
| 5,556,458 A | 9/1996 | Brook et al. | |
| 5,660,466 A | 8/1997 | Hopson et al. | |

(Continued)

FOREIGN PATENT DOCUMENTS

EP 0707030 A1 4/1996

(Continued)

OTHER PUBLICATIONS

D. Gene Daniel and Colin L. Lobo, "User's Guide to ASTM Specification C94 on Ready-Mixed", ASTM International Standards Worldwide, pp. 37-40.

(Continued)

*Primary Examiner* — Charles E Cooley
(74) *Attorney, Agent, or Firm* — Wyatt, Tarrant & Combs, LLP

(57) ABSTRACT

The present invention provides a system for treating fly ash and a method of use thereof. The system and method allow for the quick and consistent application of a chemical entity to fly ash so that the characteristics of the fly ash are changed in order to allow use of the fly ash in a new capacity. One specific example is the use of treated fly ash in concrete. The system disclosed herein may be used to treat fly ash as it is produced at a coal-burning power plant or as it is unloaded from a pneumatic truck.

10 Claims, 5 Drawing Sheets

U.S. PATENT DOCUMENTS

| | | | |
|---|---|---|---|
| 5,685,640 | A | 11/1997 | Goedicke et al. |
| 5,803,596 | A * | 9/1998 | Stephens .................. 366/10 |
| 5,887,724 | A | 3/1999 | Weyand et al. |
| 6,136,089 | A | 10/2000 | Hurt et al. |
| 6,599,358 | B1 | 7/2003 | Boggs |
| 6,638,355 | B2 | 10/2003 | Shulman |
| 6,706,111 | B1 | 3/2004 | Young |
| 6,773,500 | B1 | 8/2004 | Creamer et al. |
| 6,890,507 | B2 | 5/2005 | Chen et al. |
| 6,945,179 | B2 | 9/2005 | Ramme et al. |
| 7,144,204 | B2 | 12/2006 | Hilgraf |
| 2004/0129180 | A1 | 7/2004 | Boggs |
| 2004/0144287 | A1 | 7/2004 | Tardif et al. |
| 2004/0206276 | A1 | 10/2004 | Hil et al. |
| 2006/0140832 | A1 | 6/2006 | Luomaharju et al. |
| 2007/0045299 | A1 | 3/2007 | Tranquilla |
| 2007/0051277 | A1 | 3/2007 | Hill et al. |
| 2007/0094930 | A1 | 5/2007 | Bailey, Sr. |

FOREIGN PATENT DOCUMENTS

| | | | |
|---|---|---|---|
| JP | 52044451 | A * | 4/1977 |
| SU | 982769 | | 12/1982 |
| WO | WO03024579 | A1 | 3/2003 |
| WO | WO 2004/067198 | | 8/2004 |

OTHER PUBLICATIONS

ASTM Designation: C 618, Standard Specification for Coal Fly Ash and Raw or Calcined Natural Pozzolan for Use in Concrete, pp. 1-3, ASTM International, 100 Barr Harbor Drive, P.O. Box C700, West Conshohocken, PA 19428-2959.

ASTM Designation: C-114, Standard Test Methods for Chemical Analysis of Hydraulic Cement, pp. 1-31, ASTM International, 100 Barr Harbor Drive, P.O. Box C700, West Conshohocken, PA 19428-2959.

ASTM Designation: C-311, Standard Test Methods for Sampling and Testing Fly Ash or natural Pozzolans for use as a Mineral Admixture in Portland Cement Concrete, pp. 1-9, ASTM International, 100 Barr Harbor Drive, P.O. Box C700 West Conshohocken, PA 19428-2959.

ASTM Designation: C-430, Standard Test Method for Fineness of Hydraulic Cement, pp. 1-3, ASTM International, 100 Barr Harbor Drive, P.O. Box C700, West Conshohocken, PA 19428-2959.

ASTM Designation: C-231, Standard Test Method for Air Content of Freshly Mixed Concrete by the Pressure Method, pp. 146-154, ASTM International, 100 Barr Harbor Drive, P.O. Box C700, West Conshohocken, PA 19428-2959.

ASTM Designation: C-188, Standard Test Method for Density of Hydraulic Cement, pp. 1-2, ASTM International, 100 Barr Harbor Drive, P.O. Box C700, West Conshohocken, PA 19428-2959.

ASTM Designation: C-94, Standard Specification for Ready-Mixed Concrete, pp. 47-56, ASTM International, 100 Barr Harbor Drive, P.O. Box C700, West Conshohocken, PA 19428-2959.

* cited by examiner

FLY ASH TREATMENT SYSTEM AND METHOD OF USE THEREOF

This application is a continuation-in-part application of U.S. patent application Ser. No. 11/247,489, filed Oct. 11, 2005, now abandoned, entitled "Fly Ash Treatment System and Method of Use Thereof," which is hereby incorporated by reference in its entirety.

Be it known that I, James H. Irvine, a citizen of the United States, residing at 7625 Annesdale Dr., Cincinnati, Ohio 45243, have invented a new and useful "Fly Ash Treatment System and Method of Use Thereof."

STATEMENT REGARDING FEDERALLY SPONSORED RESEARCH OR DEVELOPMENT

Not applicable

REFERENCE TO A "MICROFICHE APPENDIX"

Not applicable

FIELD OF THE INVENTION

The present invention relates to the treatment of byproducts produced by coal-burning power plants. More particularly, fly ash, so that an alternate use is available.

BACKGROUND OF THE INVENTION

Coal Burning power plants in the United States and around the world produce tens of millions of tons of fly ash annually. The single largest beneficial application for fly ash is as a mineral admixture in concrete product markets. However, only a small percentage of annual fly ash production is utilized in concrete markets.

Emission Control technologies, implemented to reduce toxic air pollutants from coal burning power plants have had the negative consequence of producing fly ash with elevated levels of carbon or carbon that is highly absorptive/reactive. The resulting fly ash is unusable in the concrete industry and therefore must be land filled which increases costs to the electric power industry.

Fly ash utilization in concrete markets solves massive disposal problems and results in significantly improved concrete quality. During the concrete production process, air entraining agents (AEA's) are added to create a microscopic matrix of air bubbles. This air void matrix in concrete provides escape chambers for water that freezes/thaws due to changes in temperature. The freezing and thawing activity of water in concrete is a primary contributor to pre-mature cracking and long term durability issues.

AEA's have a high affinity for carbon which effectively de-activates the AEA's leaving concrete with reduced levels of air voids necessary for long term durability. Accordingly, in order to make use of the large abundance of fly ash produced annually, it is necessary to neutralize the reactive carbon existing in the fly ash.

The currently existing treatment systems and methods do not solve this problem. Fly ash is an extremely fine material that tends to absorb moisture in air resulting in a packing effect when stored or transported at a power plant. Proactive steps must be taken to prevent clumping and bridging as fly ash treatment is administered. Failure to do so results in treatment which is inconsistent and unpredictable. Also, fly ash is produced in massive quantities daily and must be rapidly treated to keep pace with production levels. Due to the extreme material handling aspects and production levels of fly ash, existing methods of chemical treatment merely dose fly ash as it free falls via gravity out of the silos in clumps, resulting in incomplete contact with the chemical agent. Further, inconsistent fly ash loading time makes it impossible to accurately dose chemical agents required for consistent homogeneous contact with carbon. Agents currently used in the treatment of fly ash may not be specific for carbon, may have activity similar to air-entrainment agents (thereby causing AEA dosing problems), have biological activity, may be leached from concrete by water, or may chemically degrade. Further, the carbon particles have a minimal opportunity to interact with the treatment compound. For these reasons—existing methods of treatment simply utilize AEA's to pre-dose the fly ash.

The invention solves the root problem of neutralizing the reactive carbon particles residing within the fly ash allowing the fly ash to be utilized in concrete production. The invention also reduces truck loading times by effectively treating the carbon as it exits the boiler en-route to the fly ash silo. Since trucking, or transportation, of the fly ash is a significant aspect of the cost, there is a need for a system and method of fly ash treatment such as the one described herein. The invention is designed to provide homogeneous application of a sacrificial agent to fly ash in order to provide fly ash having reduced carbon levels which are adequate for use in the concrete industry.

SUMMARY OF THE INVENTION

Disclosed herein is a fly ash treatment system, a method of treating fly ash as it is unloaded from a pneumatic truck, a method of treating fly ash following its production as the coal is burned, regardless of the location. Only approximately 10% of fly ash has reduced carbon levels which are adequate for use in concrete. The system and methods disclosed herein may be used to neutralize, or passivate, the reactive carbon present in the remaining 90% of fly ash so that the fly ash is capable of being used to prepare concrete having sufficient durability characteristics. One method disclosed herein is for the treatment of fly ash while the fly ash is unloaded from a pneumatic truck. Another method disclosed herein is for the treatment of fly ash at the coal burning power plant as the fly ash is transported to a silo for storage. Treatment of the fly ash as disclosed herein, such as at a coal-burning power plant or as it is unloaded from a pneumatic truck, results in a homogeneous application of the sacrificial agent to the fly ash.

A matrix of air, which is microscopic in size, is necessary in concrete to allow the concrete to expand and contract with temperature changes. Air may be provided in concrete by the addition of air entraining agents (AEA). AEA's have a strong affinity for carbon which effectively deactivates the agents. Accordingly, fly ash with a reactive carbon content deactivates the AEA, reduces the percentage of air in the concrete and results in premature cracking concrete and reduced durability characteristics. The invention disclosed herein offsets the durability-reducing properties of unburned carbon. Accordingly, it is important to have a method of fly ash treatment which consistently results in a homogenous application, as the invention disclosed herein.

Disclosed herein is a fly ash treatment system, including, a chemical entity storage chamber, a first fluid conduit attached to the chemical entity storage chamber, a second fluid conduit attached to the first conduit and the chemical entity storage chamber, so that the chemical entity is re-circulated to the storage chamber, a chemical pump attached to the first fluid conduit, a valve attached to the second fluid conduit, a third fluid conduit attached to the valve, so that the chemical entity is directed to either the second fluid conduit or the third fluid conduit, a chemical nozzle attached to the third fluid conduit, a compressed air source operationally attached to the chemical nozzle, a treatment chamber attached to the chemical nozzle, and a transportation pipe attached to the treatment chamber. Also disclosed herein is a fly ash treatment system, including a chemical entity storage chamber, a first fluid conduit attached to the chemical entity storage chamber, an ambient heater operationally attached to the control panel, an in-line heater operationally attached to the control panel, wherein the in-line heater is attached to the first fluid conduit, a chemical pump attached to the first fluid conduit, a control panel operationally attached to the chemical pump, a valve attached to the first fluid conduit, a second fluid conduit attached to the valve and the chemical entity storage chamber, a third fluid conduit attached to the valve, a first visual flow detector attached to the first fluid conduit, a second visual flow detector attached to the third fluid conduit, a totalizer attached to the third fluid conduit, a chemical nozzle attached to the third fluid conduit, and a compressed air source operationally attached to the chemical nozzle. The system may also include the chemical entity storage chamber being from about 125 gallons to about 500 gallons.

In still another embodiment, the present invention is a chemical delivery system, including a chemical storage tank, a chemical pump in fluid connection with the chemical storage tank, a first plurality of fluid conduits attached to the chemical storage tank and the chemical pump, so that a chemical entity in the chemical storage tank is transported from the tank through the plurality of fluid conduits and back to the tank in order to provide constant circulation of the chemical entity, a valve attached to the plurality of fluid conduits so that use of the valve results in the chemical entity being redirected for delivery, a second plurality of fluid conduits attached to the valve, a nozzle attached to each of the second plurality of fluid conduits, a treatment chamber enclosing the nozzle, the treatment chamber having a conical shape, wherein the nozzle is recessed within a wide end of the conical shape of the treatment chamber, and an ash transportation pipe attached to the treatment chamber, wherein ash traveling through the transportation pipe receive the chemical entity from the nozzle and the chemical entity and ash interact during transportation therethrough. In certain embodiments, the system further includes a compressed air source so that the chemical entity passes through the nozzle at a predetermined PSI. Other embodiments further include a first visual flow detector attached to the first plurality of fluid conduits, a second visual flow detector attached to the second plurality of fluid conduits, or a chemical pump rate controller attached to the chemical pump. In still other embodiments, the chemical pump rate controller adjusts the rate of the chemical pump by adjustments as small as 1 gallon per hour. This embodiment may include a heater attached to the first plurality of fluid conduits so that the chemical entity is maintained at a desired temperature. This embodiment may be a mobile unit. In still other embodiments, ash transportation pipe has a diameter of from about 3 inches to about 6 inches, and a length of at least 6 feet.

Also disclosed herein is a system for treating fly ash as it is unloaded from a pneumatic truck. Such a system includes a transportation pipe, a treatment chamber attached to the transportation pipe, at least one chemical nozzle attached to the treatment chamber, a chemical pump attached to the chemical nozzle, and a chemical reservoir attached to the chemical pump. In certain embodiments, the transportation pipe is at least 10 feet long, and has a diameter of from about one inch to about 14 inches.

Disclosed herein is also a method of treating fly ash either at a coal-burning power plant as it is transported to a storage silo, or as it is unloaded from a pneumatic truck. The method includes receiving fly ash in a first storage chamber, transporting fly ash from the storage chamber to a treatment chamber, placing the fly ash in the treatment chamber, applying a sacrificial agent on the fly ash in the treatment center, moving the fly ash from the treatment chamber to a transportation pipe, and moving the fly ash from the transportation pipe to a second storage chamber. In certain embodiments, transporting the fly ash to the treatment chamber occurs at a rate of about 1000 lbs/min to about 5000 lbs/min. In still other embodiments, transporting the fly ash to the treatment chamber occurs at a rate of about 900 lbs/min to about 1100 lbs/min. In certain embodiments, applying the sacrificial agent further includes atomizing the sacrificial agent having a gaseous consistency. In still other embodiments of the invention, applying the sacrificial agent occurs at a rate of from about 0.25 gallons/ton to about 0.5 gallons/ton. In still other embodiments of the present invention, fly ash may be moved through the system by use of a vacuum or a compressor. In still other embodiments, the method further includes preparing concrete with treated fly ash and assaying the percentage of air in the concrete.

Accordingly, one aspect of the present invention is to provide a system for treating fly ash which results in a homogenous application of a sacrificial agent to the fly ash.

Another aspect of the present invention is to provide a system for treating fly ash which requires minimal chemical dosing.

Still another aspect of the present invention is to provide a system for treating fly ash which optimizes the coating, or treatment, of the fly ash with a sacrificial agent due to the specific manner of application.

Another aspect of the present invention is to provide a method of treating fly ash which occurs at a location other than a storage silo for loading pneumatic trucks and occurs at a rate sufficient to match the fast paced concrete industry.

Still another aspect of the present invention is to provide a method for quickly and efficiently treating fly ash in order to produce a quality of fly ash capable of use in cementious compounds having adequate durability characteristics.

DETAILED DESCRIPTION OF THE INVENTION

This patent application discloses fly ash treatment system 10 and method thereof for treating fly ash as it is unloaded from a pneumatic truck. Also disclosed is another embodiment of the system 10 for treating fly ash at a power plant. The present methods of treating fly ash result in fly ash which is treated with consistent results and resolves the problems of the currently available treatment methods, including fly ash clumping, bridging and non-homogenous chemical application. The resolution of these problems is due to the system 10 disclosed herein. The method of treating fly ash as it is unloaded from a pneumatic truck relieves a concrete manufacturer from the burden of storing untreated fly ash.

The first description herein is the disclosure of an embodiment of the system 10 which is used to treat fly ash at a power plant. The following description is that of an embodiment of the system 10 which is used to treat fly ash as it is unloaded from a pneumatic truck.

Figure 1:
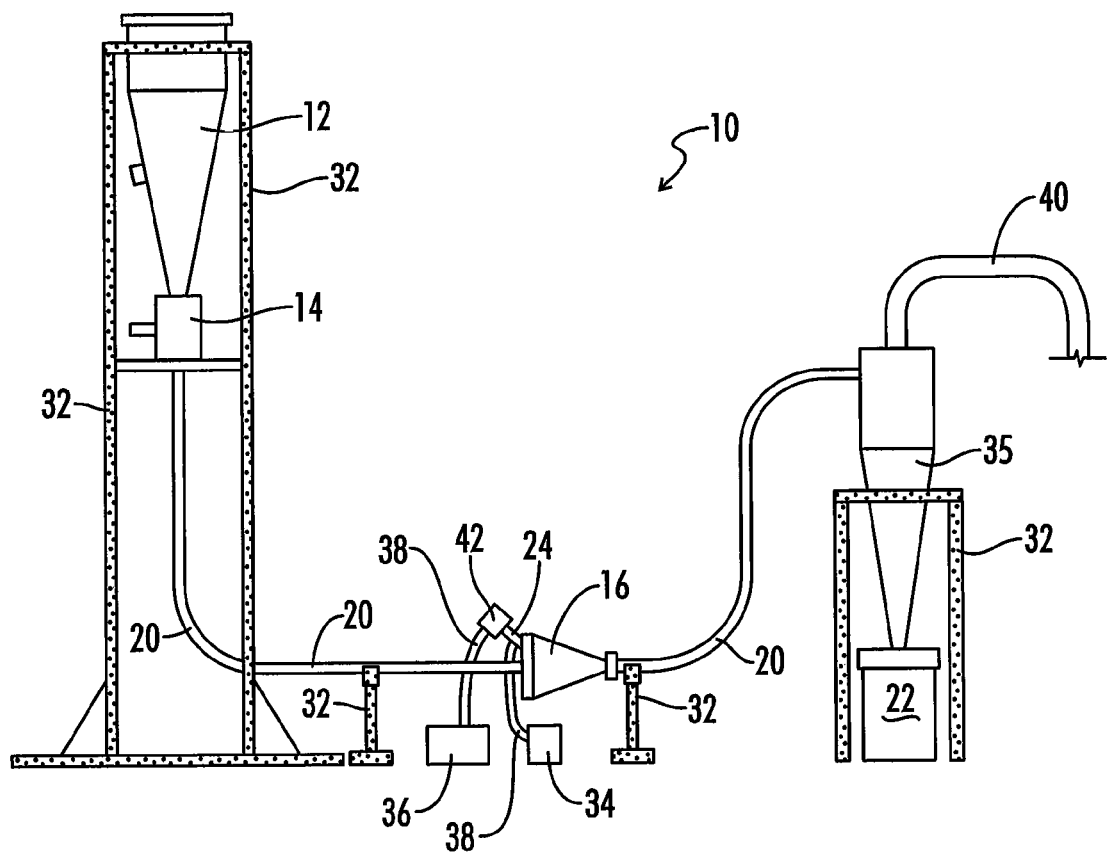
FIG. 1 is a schematic drawing of an embodiment of the fly ash treatment system for treatment at a coal-burning power plant. Shown there is a first storage chamber for collecting the fly ash to be treated, a rotary feeder for transferring the fly ash to the treatment chamber, and the treatment chamber including a chemical nozzle. A chemical pump supplies the sacrificial agent which is atomized into a mist by the compressed air source and nozzle. The transportation pipe allows the fly ash and sacrificial agent to undergo chemical reactions as they mate, or assimilate as they are transported to the second storage chamber.
Figure 2:
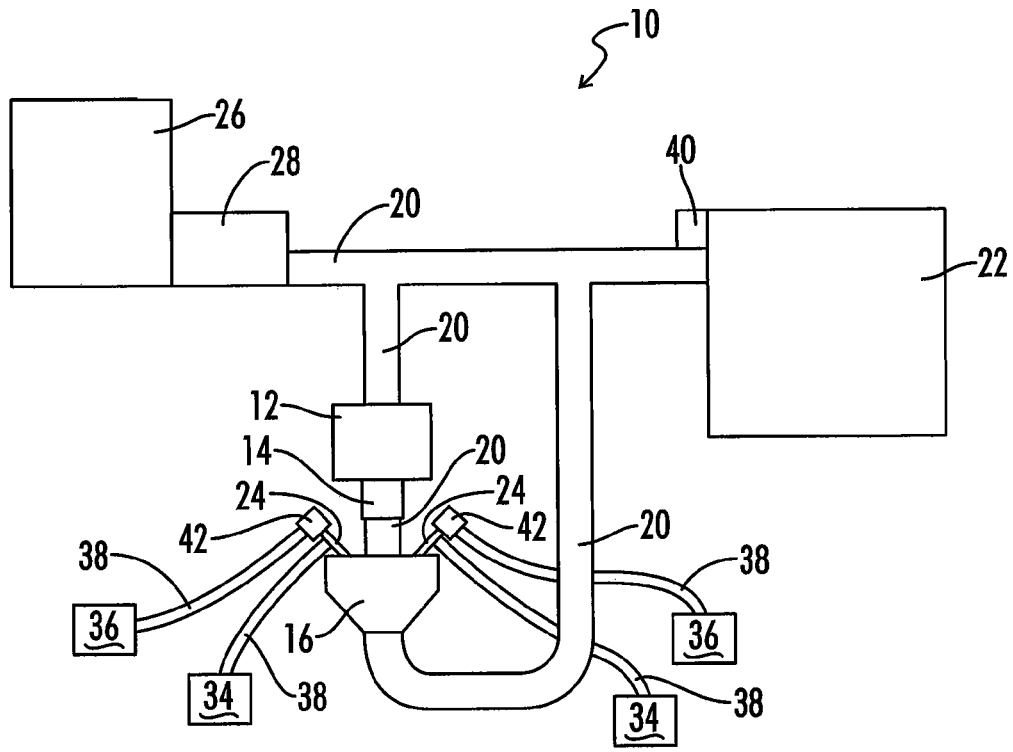
FIG. 2 is a schematic drawing of another embodiment of the fly ash treatment system for use at a coal-burning power plant. Specifically, as the ash is produced in the boiler and travels through the precipitator into the transportation pipe, the fly ash is diverted into the system for treatment with a sacrificial agent. Subsequent to treatment, the treated fly ash is reintroduced into the transportation pipe and transferred to the silo for storage.

Referring now to FIG. 1, there is shown a first embodiment of a fly ash treatment system 10. Shown is a system 10 including a first storage chamber 12, rotary feeder 14, treatment chamber 16, transportation pipe 20, second storage chamber 22, and nozzle 24. The first storage chamber 12 merely receives the fly ash from a power plant, or from a precipitator 28, as shown in FIG. 2. The first storage chamber 12, also known as a silo, may have a device for delivering rifle shots of air to assist in fluidizing the fly ash for movement of the fly ash therethrough. Also shown in FIG. 1 are the support members 32 which provide the framing to hold the system 10 as shown. Alternate embodiments may also include air nozzles or fluidizers to assist in the movement of the fly ash through the silo. The storage chamber 12, or silo, is constructed of material well known in the art for the temporary storage, or long term storage, of fly ash.

The amount of fly ash present in the transportation pipe 20 at any given time is related to the system's 10 ability to equally and consistently apply the sacrificial agent while the fly ash moves through the transportation pipe 20. One important aspect of the invention is that the sacrificial agent and fly ash continue to mix in the transportation pipe 20. In order to allow sufficient mixing, the transportation pipe 20 may be at least 10 feet in length. Also, since the cross sectional area of the transportation pipe 20 is related to the application of the sacrificial agent to the fly ash, the amount of such cross sectional space may vary. In certain embodiments, the cross sectional area of the transportation pipe 20 may be that of a pipe having a diameter of at least one inch. In still other embodiments, the cross sectional area of the transportation pipe 20 may be that of a pipe having a diameter of from about one inch to about 15 inches. In still other embodiments, the cross sectional area of the transportation pipe 20 may be that of a pipe having a diameter of from about four inches to about 12 inches. In other embodiments, the diameter of the pipe may be from about four inches to about five inches. Given the disclosure herein, one of ordinary skill in the art may modify the diameter or a cross sectional space of the transportation pipe 20 in order to accomplish the treatment characteristics disclosed herein.

Figure 8:
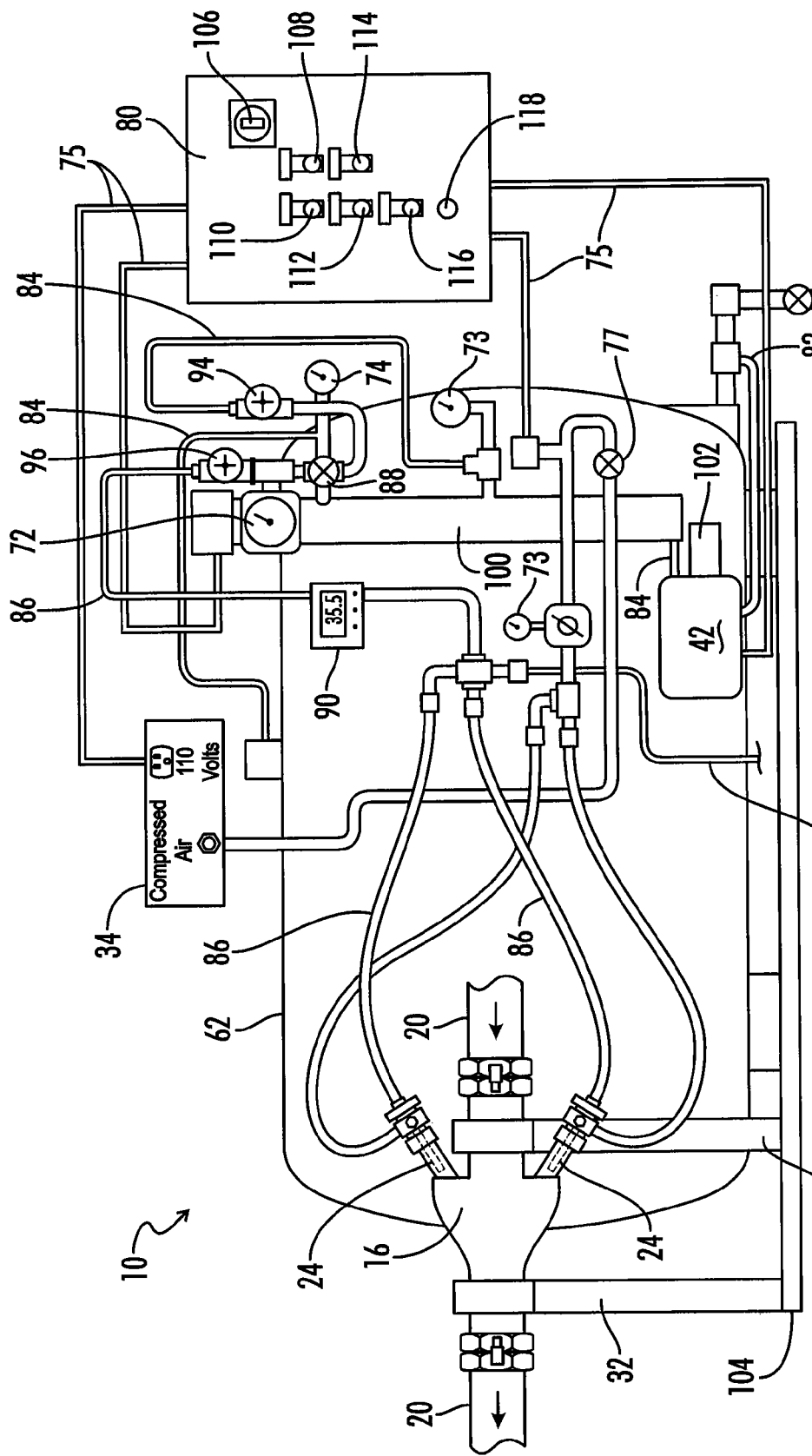
FIG. 8 is a side view of another embodiment of the present invention. Shown there is the entire pathway of the chemical entity from the storage tank to the treatment chamber.

Still referring to FIG. 1, shown there is the treatment chamber 16 of the present system 10. The treatment chamber 16 may be constructed of any rigid material and the size may vary as described herein. In certain embodiments, the treatment chamber 16 may include a conical shaped chamber having at least one chemical nozzle 24. The treatment chamber 16 allows the chemical nozzle 24 to deliver a predetermined chemical without the nozzle 24 entering the path of the fly ash. Any chemical nozzle 24, or other dispensing device, which is placed in the path of the fly ash will be damaged over time due to the constant abrasion provided as the fly ash travels across the device. Accordingly, as best seen in FIG. 8, the nozzles 24 are offset in the wide end of the conical shaped treatment chamber 16. In certain embodiments, the treatment chamber 16 may have 2, 3, 4, 5, 6, 7, or 8 chemical nozzles 24 so that a mixture of chemicals may be delivered at a given time, or so that a greater number of nozzles 24 may be used when delivering larger volumes of chemical entities. The amount of chemical entity to be used for a treatment is easily calculated by a user based upon the specific chemical entity being applied and the characteristics of the fly ash to receive the treatment.

Multiple nozzles 24 may be inserted in to the treatment chamber 16 in order to apply the sacrificial agent to the fly ash. In still other embodiments, nozzles 24 may be placed in a plurality of locations in order to apply the sacrificial agent from a plurality of locations. The nozzle 24 releases the sacrificial agent as a spray, mist, gas, or the like. The sacrificial agent may be forced through the nozzle 24 under air pressure of at least 40 PSI. In certain embodiments, the sacrificial agent may be under air pressure of from about 40 PSI to about 80 PSI. Such nozzles 24 are well known in the industry and widely commercially available.

The nozzle 24 is attached to tubing 38 leading to a compressed air 34 source, chemical reservoir 36, and chemical pump 42. The chemical reservoir 36 holds the sacrificial agent which is to be applied to the fly ash. In certain embodiments, the chemical reservoir 36 may be referred to as a tank 62. The chemical pump 42 pumps the proper amount of the sacrificial agent to the nozzle 24. The compressed air 34 is used to nebulize, fog, or mist the sacrificial agent from the liquid state in which it exists in the chemical reservoir 36, or tank 62. The PSI of the compressed air 34 is adjustable in order to optimize the delivery of the sacrificial agent. Compressed air 34 sources are well known in the art and readily commercially available. An example is a 15 horsepower air compressor, commercially available from Sullair Corporation, 3700 East Michigan Blvd., Michigan City, Mich. 46360. The chemical reservoir 36 may be a chemical storage tank, or other chemical storage device, as known in the industry, which are readily commercially available. Chemical pumps 42 are well known in the art and are readily commercially available.

Still referring to FIG. 1, the transportation pipe 20 transports the treated fly ash to a second storage chamber 22 via a silo member 35 to collect the treated fly ash. It is noteworthy that mixture of the sacrificial agent and the fly ash may continue during transportation of the fly ash through the transportation pipe 20. The transportation pipe 20 may be constructed of any rigid material and such transportation pipes 20 are well known in the industry and readily commercially available. An example of a second storage chamber 22 is a silo for storing treated fly ash which is waiting to be shipped or otherwise used. Such a second storage chamber 22 may include a 4,000 ton silo. In certain embodiments, an alternate vacuum or compressed air 34 source may be used to facilitate transportation of the treated fly ash from the treatment chamber 16 to the second storage chamber 22. Examples of such air pressure systems include the systems of coal-burning power plants, and pressure systems for pneumatic trucks. Such vacuum sources, or compressed air 34 sources are well known in the industry and readily commercially available. In certain embodiments, the transportation pipe 20 is plumbed to the load out silo. Alternately, certain embodiments may include a bag house 40 in order to vent the air pressure from the system 10 and allow the treated fly ash to collect in the second storage chamber 22.

Referring now to FIG. 2, there is shown an embodiment of the present system 10 which may be used in association with a currently existing coal-burning power plant. With reference to power production in general, and in the absence of the present invention, coal is burned in a boiler 26, the air is vented and the ash travels through an electrostatic precipitator 28. The ash then travels to a transportation pipe 20, having air movement due to a vacuum or a compressed air 34 source, so that the ash is transported to a storage silo, referred to herein as a second storage chamber 22. In the absence of the present invention, the fly ash which is stored in the silo, also called second storage chamber 22, has not been treated and may contain reactive carbon.

The embodiment of the system 10 shown in FIG. 2 allows treatment of fly ash with a sacrificial agent at a rate which may be predetermined by the user. In certain embodiments, the system 10 may "tap into" a transportation pipe 20 of an existing power plant in order to redirect the untreated fly ash through the presently disclosed system 10 and allow collection of the treated fly ash in a storage silo, also called a second storage chamber 22.

Shown in FIG. 2 is the path which fly ash travels upon treatment with the present system 10. From the precipitator 28, there is a transportation pipe 20 leading to a first storage chamber 12. In this embodiment, there is a plumb line to the load out silo. Once fly ash is received in the first storage chamber 12, a rotary feeder 14 moves it into the transportation pipe 20. A sacrificial agent is applied to the fly ash within the treatment chamber 16 by use of chemical nozzles 24, attached to tubing 38 leading to a compressed air 34 source, chemical reservoir 36, and chemical pump 42. Then, the treated fly ash and sacrificial agent travel through the transportation pipe 20 to the second storage chamber 22. Once received at the second storage chamber 22 the fly ash is stored until transported or until used.

Figure 3:
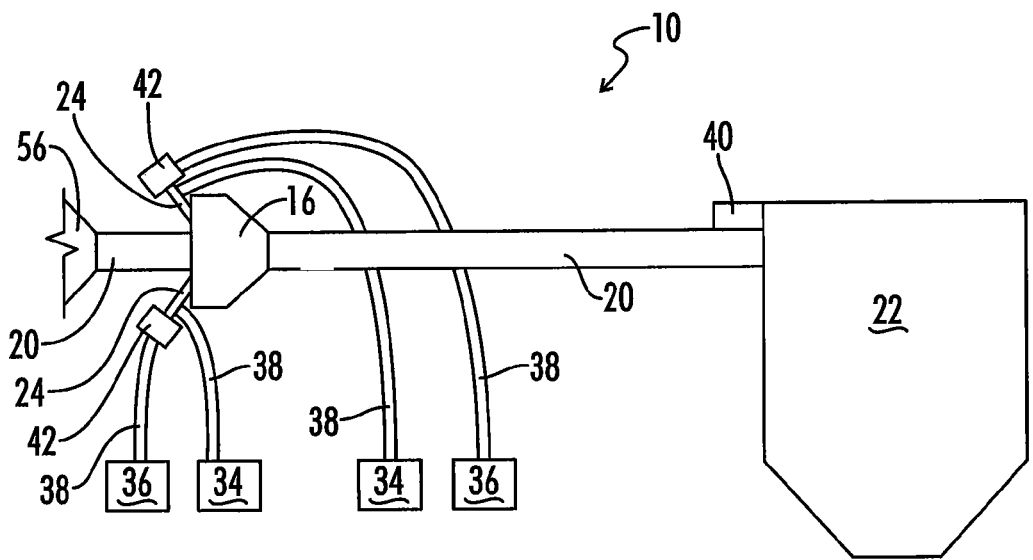
FIG. 3 is a schematic drawing of an embodiment of a fly ash treatment system for use when unloading a pneumatic truck. The opening of the truck is shown. The fly ash passes through a first segment of the transportation pipe and into the treatment chamber for application of the sacrificial agent. Then, the sacrificial agent and fly ash continue to mix in the second segment of the transportation pipe as they are transported to the silo.

In addition to treatment at the coal-burning power plant, treatment may occur at a concrete production plant. Specifically, treatment may occur as the fly ash, being transported from the power plant to the concrete plant, is unloaded from the pneumatic truck. Accordingly, in one embodiment, the rate of treatment disclosed herein may be from about 900 lbs/minute to about 1100 lbs/minute. As best seen in FIG. 3, the system 10 for such an embodiment may include a transportation pipe 20, a treatment chamber 16 having at least one chemical nozzle 24, attached by tubing 38, or other means, to a chemical pump 42, a compressed air source 34, and a chemical reservoir 36. The system 10 may attach to the unloading opening 56 of a pneumatic truck, or other transportation vehicle, so that while the fly ash is unloading to the silo, or second storage chamber 22, it is treated with the sacrificial agent.

Figure 4:
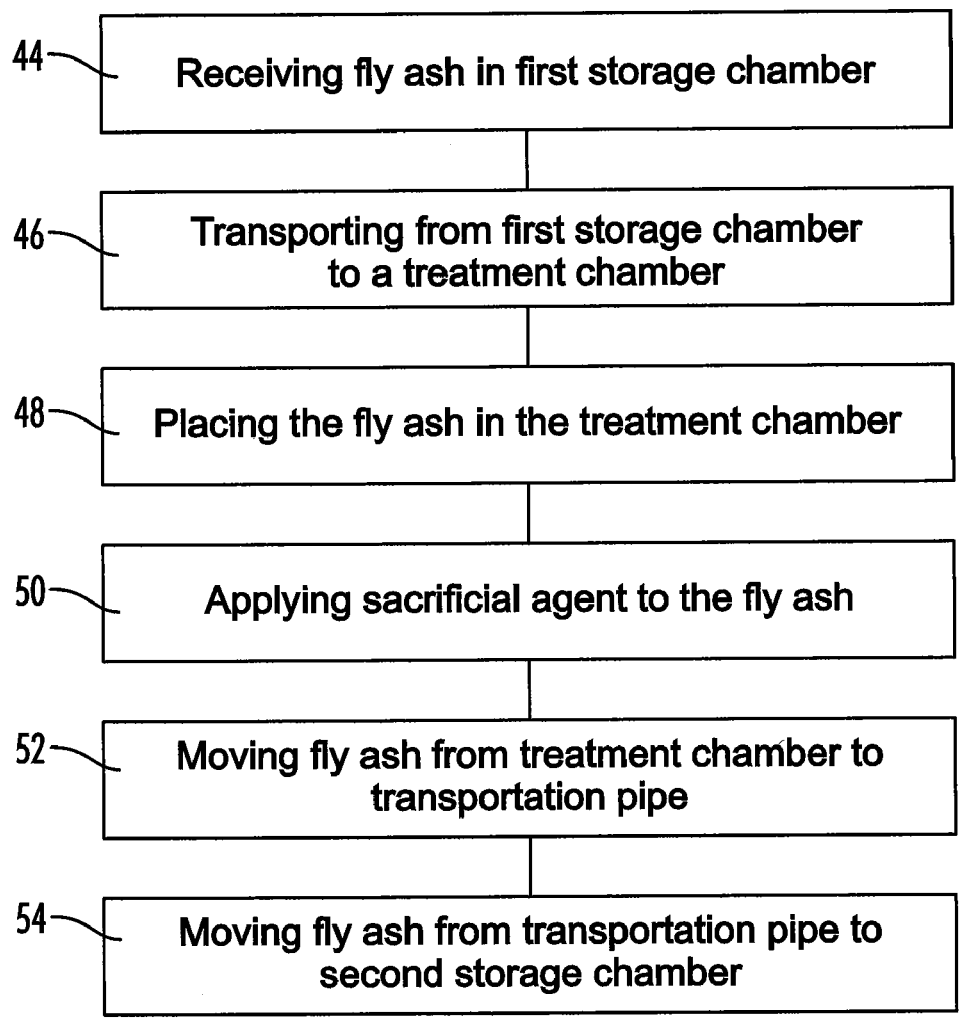
FIG. 4 is a flow diagram showing the steps of an embodiment of the current invention.

Referring now to FIG. 4, there is shown a flow diagram for an embodiment for the method of treating fly ash as it is produced at a coal burning power plant. The first embodiment of the method includes the steps of receiving 44 fly ash in the first storage chamber 12, transporting 46 the fly ash from the first storage chamber 12 to a treatment chamber 16, placing 48 the fly ash in the treatment chamber 16, applying 50 a sacrificial agent to the fly ash, moving 52 fly ash from the treatment chamber 16 to the transportation pipe 20 and moving 54 fly ash from the transportation pipe 20 to a second storage chamber 22.

In certain embodiments, the rate of transportation of fly ash through the transportation pipe 20 may be within the range from about 500 lbs/min to about 2,500 lbs/min. In alternate embodiments, the method of treating fly ash may occur at a rate which is at least 500 lbs/min. In still other embodiments, the rate of transportation of fly ash through the transportation pipe 20 may be within the range from about 1000 lbs/min to about 5000 lbs/min.

Figure 5:
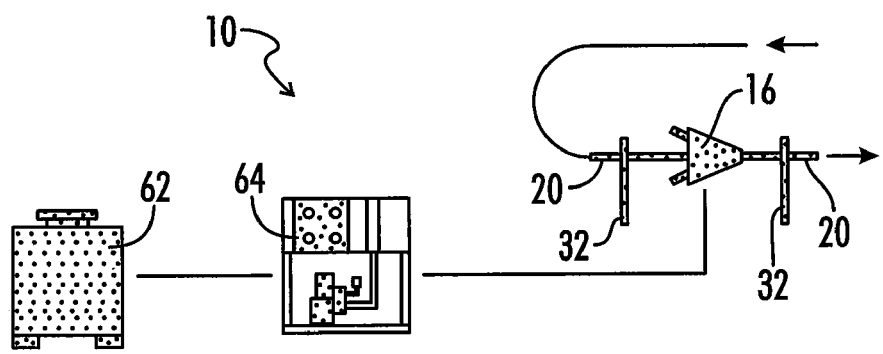
FIG. 5 is a schematic drawing of an embodiment of the fly ash treatment system. Shown therein is the tank module, metering module, and injector module.

Referring now to FIG. 5, there is shown another embodiment of the present invention. As shown therein, this embodiment of the system includes at least three modules. First, chemical entity storage chamber 62, or tank 62, is used to store the chemical entity to be used to treat the fly ash. Like the chemical reservoir 36, this holds the chemical entity to be applied. An example of a chemical entity storage chamber 62 is a 350-gallon portable and returnable container. Large tanks 62 such as this may be placed by a forklift and attached to the remainder of the system by quick-disconnect fittings and hoses. Alternatively, permanent tanks 62 may be used. Such permanent tanks 62 may have a capacity of 4,000 to 10,000 gallons. In colder climates, tanks 62 may require heat and/or insulation.

Still referring to FIG. 5, the second module of this embodiment is a metering module 64. The metering module 64 is a chemical pump 42 which may be adjustable for the accurate dispensing of a chemical entity. An example of the chemical pump 42 is a rotary vane chemical metering pump, commercially available from Jackson Machine Co., Yorkville, Ill., with a brass-body pump having carbon graphite vanes and liner. Such a pump operates at up to 1750 RPM and includes an internal pressure relief system. It is powered by a General Electric, NEMA 56C-frame, ½ horsepower, 0-90 VDC, PM motor. The chemical pump 42 may include a motor, electrical controls, and piping, or hose, system. This metering module 64 is operationally connected to the tank 62 and the treatment chamber 16, as further described below. Operation of the metering module 64 in colder climates may require heat and/or insulation.

Shown within FIG. 5 is the third module of this embodiment is the injector module. The injector module includes the treatment chamber 16, piping sections having nozzles 24 for the distribution of the chemical entity evenly into the fly ash which is moving through the system. Compressed air is required to provide optimal atomized injection of the chemical entity. Detailed descriptions of embodiments of the injector module are found throughout this document.

Still referring to FIG. 5, schematic drawings are shown to represent the embodiment of the system 10. Additional detailed drawings, showing the operational connections of the invention, are shown in subsequent figures. Examples of the operational connections for the transportation of fly ash or the chemical entity through the system 10 are well known to those of skill in the art. Specific examples of such hoses, connections, and accessories which may be used with the present invention include pressure switches, remote start units, check valves, portable tank adapters and valves, chemical transfer hose assemblies, air hose supply assembly, chemical injection hose assemblies, and the like. These items are widely commercially available and well known to those of skill in the art. Additional accessories that may be used for connection of the system 10 may include tank basins, pump basins, hose basins, sorbent drums, and the like. These items, too, are widely commercially available. Connection and assembly of the modules of the system 10 are described herein, in addition to one of ordinary skill being familiar with the types of connections needed for the transportation of fly ash and chemical entity through the system 10.

Figure 6:
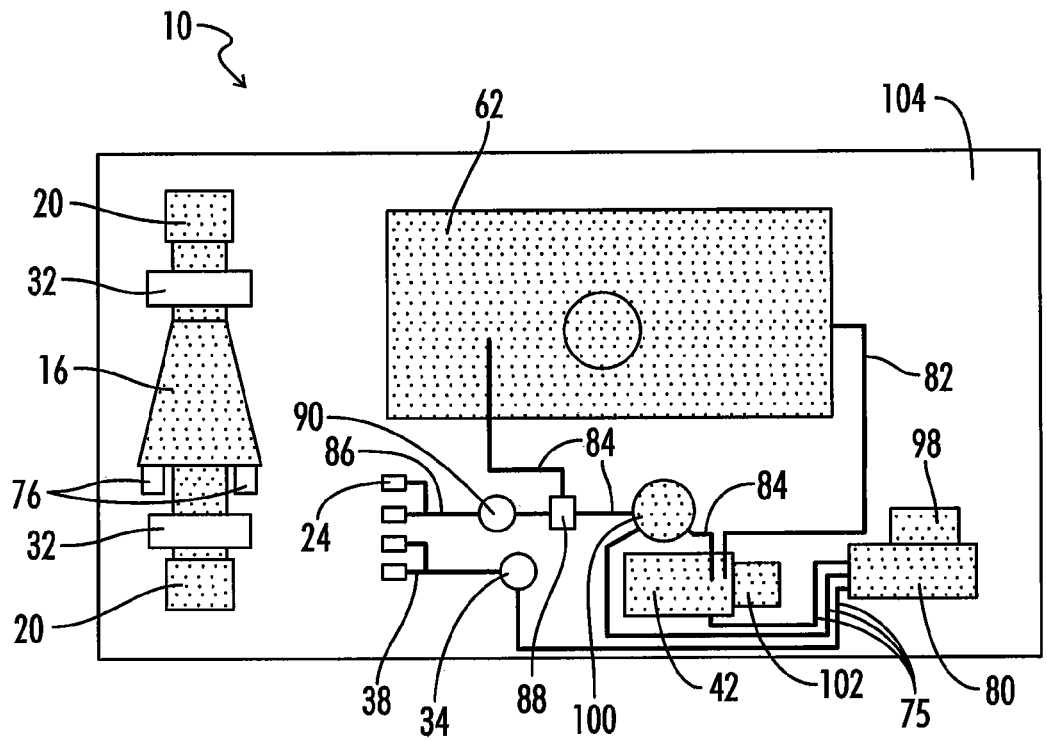
FIG. 6 is a top view of an embodiment of the present invention. Shown in that embodiment is the positioning of the tank relative to the fly ash transportation pipe and treatment chamber.

Referring now to FIG. 6, there is shown a top view of an embodiment of the present invention. The invention includes a control panel 80, first fluid conduit 82, second fluid conduit 84, third fluid conduit 86, valve 88, chemical pump 42, totalizer 90, pressure gauge 73, first visual flow detector 94, second visual flow detector 96, and strainer. A chemical entity located in the tank 62 is transported by a chemical pump 42 through a first fluid conduit 82. The first fluid conduit 82 attaches to a second fluid conduit 84 to transport the chemical entity to the in-line heater 100 and to a valve 88. The user, by manipulating the valve, determines whether the chemical entity is directed toward the tank 62 through the second fluid conduit 84, or to the treatment chamber 16 for delivery. If the chemical entity is directed to the treatment chamber 16, then a third fluid conduit 86 carries it to the nozzles 24. The nozzles 24 are inserted in the treatment chamber 16, as best seen in FIG. 8, and attached by use of a quick release fitting 76, or the like. As shown in FIG. 6, the third fluid conduit 86 attached to the nozzles 24 is not attached to the treatment chamber 16. FIG. 8, further described below, shows such attachment of the nozzles 24 to the treatment chamber 16. In certain embodiments, the capacity of the chemical pump 42 may be up to 18 gallons per hour, at 350 PSI. An example of the chemical pump 42 is the Neptune 535-A-N1, commercially available from Neptune Chemical Pump Company, of Lansdale, Pa. 19446. Totalizers 90 are used to measure chemical flow and are widely commercially available from a company such as GPI Inc. In certain embodiments, the invention includes an ambient heater 98. An example of such an ambient heater 98 is the Hoffman 800 watt space heater with thermostat. In still other embodiments, the invention may include an in-line heater 100 to heat the chemical entity as it circulates through the first fluid conduit 82 and second fluid conduit 84. Such heaters are well known and widely commercially available. An example of the in-line heater 100 is the 1100 watt Accu-Therm cartridge heater with thermostat.

Figure 7:
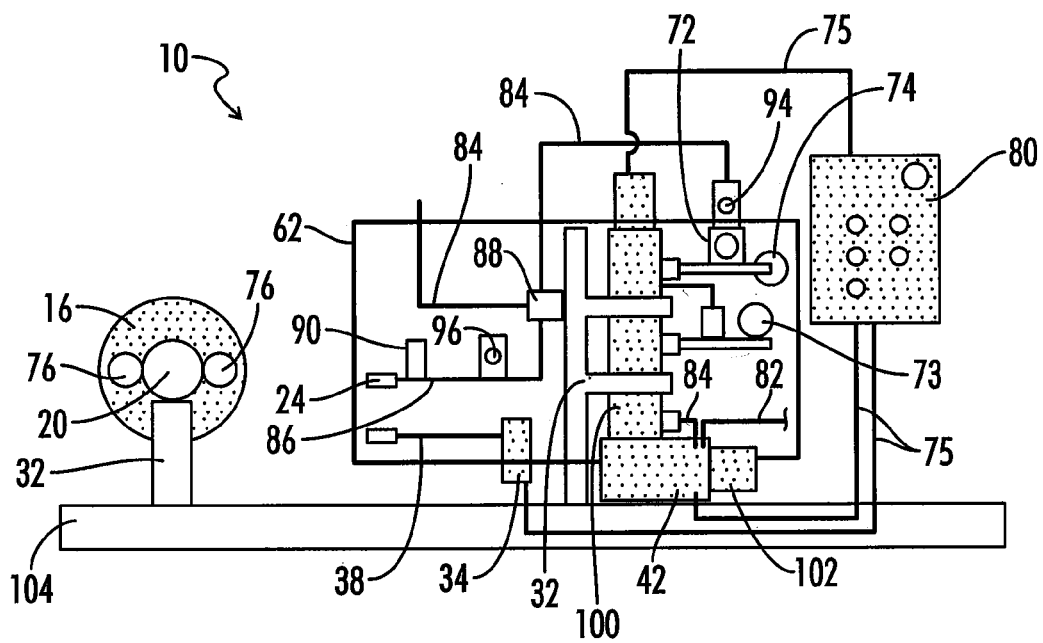
FIG. 7 is a side view of an embodiment of the present invention. Shown in that embodiment is the positioning of the modules of the present invention.

Referring now to FIG. 7, there is shown a side view of an embodiment of the present invention. The control panel 80, which is further described below, is largely used to operate the invention. The control panel 80 may have a manual control or a remote start capability. Obviously, remote operation requires additional wiring. The chemical pump 42 runs on standard voltage 120VAC, 60 HZ. In certain embodiments, the control panel 80 includes a DC-SCR variable speed motor drive 102, also called a rate controller for the chemical pump 42, circuit breakers, wiring, and terminal strips. The rate controller 102 may be located within the control panel 80 or adjacent to the chemical pump 42. In certain embodiments, devices for visual confirmation of chemical entity flow, herein called first and second visual flow detectors 94, 96, respectively, are present for the movement of the chemical entity during recirculation and for the chemical entity being pumped to treat the fly ash. Examples of such devices include paddle wheel type displays, or other forms of visual confirmation. Each element of the module is widely commercially available and is assembled and operationally connected as shown and described herein. In certain embodiments, the invention may be a free standing and enclosed structure which is operational under various weather conditions. Such an embodiment may be used at a power plant facility with changes, as known to those of ordinary skill in the art, for scaling up the embodiment to handle such capacity. For example, the invention may be a portable housing which may be lifted by forklift, or equivalent, and is constructed from a stable and rigid material such as steel, other metal, or the like. In other embodiments, as the one shown in FIGS. 6 and 7, the system 10 may be mounted on a base 104 for transportation in a vehicle, for example a van, in order to function as a mobile unit.

Still referring to FIG. 7, in certain embodiments, the capacity of the chemical pump 42 is from about 0.7 to about 18 gallons per hour and operates at pressures up to 350 PSI. The chemical pump 42 may be adjustable to allow modification of the capacity from 10% up to 100%. Such pumps are widely commercially available, for example the Neptune 500 Dia-Pump, from Neptune Chemical Pump Company, of Lansdale, Pa. 19446. Regarding the piping system of the metering module 64, that system may include an inlet ball valve, strainer, calibration cylinder and valve to check pump output, tube fittings, bleed valve, and pressure gauge. One of ordinary skill in the art knows of suitable pipe, tube, hose, and fittings for the temperature, pressure, and fluid characteristics under which the pump is used. For example, inlet side piping should be as short and large as possible to keep resistance to flow minimized. A "flooded suction" is recommended. One of ordinary skill in the art is familiar with the start up, calibration, and maintenance of such pumps.

Referring back to FIG. 6, there is shown an embodiment having an ambient heater 98 and an in-line heater 100. When the ambient temperature is below 50 degrees F., it has been noted that chemical entities may increase in viscosity. A consequence of increased viscosity is a change in flow rate which may result in inaccurate dosing. Accordingly, certain embodiments include an in-line heater 100, also called an immersion heater, and temperature gauge. In certain embodiments, a ¾ inch hose is used to make the connections. The thermostat of the heater 100, a heating element, may be set as desired. In certain embodiments, it may be desirable to set the temperature at about 80 degrees F. Also shown in the figure are the operational connections 75 from the control panel 80, which are further described below.

As stated elsewhere in this document, the sacrificial agent, or chemical entity, may be one of those entities known in the art to accomplish the functions described herein.

Still referring to FIGS. 6 and 7, the various fluid conduits may include ¼ inch piping. Alternatively, the fluid conduits may include ½ or ¼ inch piping. Pneumatic pressure through a ½ pipe provides the force to atomize the chemical entity for delivery to the flowing fly ash.

Referring now to FIG. 8, there is shown a side view of an embodiment of the present invention. In certain embodiments, the treatment chamber 16 and transportation pipe 20 may be positioned parallel to the tank 62, as shown in the figure. In alternate embodiments, the treatment chamber 16 and transportation pipe 20 may be positioned perpendicular to the tank 62, or as otherwise desired by the user based upon the positioning of the components to which the transportation pipe 20 attach. The shown embodiment of the invention is controlled by the control panel 80. The control panel 80 is operationally connected to the components shown. The operational connections 75, for example power cords, provide power to the shown components through the control panel 80, as known by those of ordinary skill in the art. In order to use the invention, after a power supply is provided, the power switch 106 is turned on. When on, a pilot light 108 may glow for confirmation. A second pilot light 110 may be used to confirm that the chemical pump 42 is running. A selection 112 on the control panel 80 determines whether a remote controlled unit may operate the invention. A selection of "remote" or "local" is made. Selection of "remote" just means that, the chemical pump 42 may be started or stopped with a remote control. Remote control technology is well known to those of skill in the art. The control panel 80 allows for the ambient heater 98 or the in-line heater 100 to be turned on and set to a predetermined temperature, by use of the heater selection 114. In certain embodiments, the temperature of the ambient heater 98 or in-line heater 100 may be set on the heater itself. The control panel 80 allows for the operation of the compressed air source 34 to be interlocked with the operation of the chemical pump 42 when the dial 116 is set. When interlocked, if air pressure is low, the chemical pump 42 may not operate. When not interlocked, the chemical pump 42 may operate regardless of the air pressure generated by the compressed air source 34. Finally, the control panel 80 provides a pump speed control 118 which allows for the selection of a percentage of available RPM of the chemical pump 42 to adjust the chemical entity flow of the invention.

When treating fly ash from a pneumatic truck, connection of the transportation pipe 20 to the standard hoses of the pneumatic truck are made as known in the art. After the power is turned on for the system 10, selection 112 is made for "remote" or "local", the compressed air valve 77 is opened to allow the system 10 to be pressurized, and the chemical delivery valve 88 is opened for delivery of the chemical entity. Confirmation of delivery of the chemical entity is available by viewing the movement of the second visual flow detector 96. The specific rate of chemical entity delivery is controlled by the rate controller 102 for the chemical pump 42. The totalizer 90 tracks the total volume of chemical entity delivered during a specified period. The rate to use for chemical entity delivery is calculated by knowing the amount of fly ash to be off loaded from the pneumatic truck in a given period of time, as known by those of skill in the art. For example, when a user knows the volume of chemical entity to be applied per ton of fly ash, the number of tons of fly ash to be off loaded from the pneumatic truck, and the amount of time required to off load the specified number of tons, then the rate of delivery of the chemical entity is also known.

Still referring to FIG. 8, the chemical entity stored in the tank 62 may be delivered to the treatment chamber 16 when the user so desires. The user controls the rate of delivery of the chemical entity. By way of example, the chemical entity is pumped from the tank 62 by a chemical pump 42. The chemical entity travels via the first fluid conduit 82, through the chemical pump 42 and into the second fluid conduit 84. The second fluid conduit 84 leads to the in-line heater 100, first visual flow detector 94, and valve 88. The user determines whether the valve 88 directs the chemical entity to the second fluid conduit 84 or the third fluid conduit 86. The second fluid conduit 84 leads to the tank 62, such that the chemical entity is recirculated through the system 10. The third fluid conduit 86 leads to a second visual flow detector 96, totalizer 90, and nozzles 24 which are placed in the treatment chamber 16. Also shown in the figure are a temperature gauge 74 for checking the temperature of the chemical entity, a rate meter 72 for determining the flow rate of the chemical entity, and pressure gauge 73 for determining the pressure provided by the compressed air source 34. Further, the figure shows the nozzles 24 housed within the treatment chamber 16. The embodiment shown uses two nozzles 24, however, more could be used. The chemical entity is disbursed by the nozzles 24 as the fly ash travels through the transportation pipe 20 in the direction indicated by the arrows. Also shown is a drain line 78 to allow drainage from the third conduit 86, such as when chemical treatment is complete and the system is being cleaned.

In certain embodiments, the treatment of fly ash may be dependent upon certain characteristics of the fly ash, such as the percent of carbon present, fineness, moisture and specific gravity. Accordingly, for determining these characteristics, all apparatus, reagents, and techniques shall comply with the requirements of Test Methods of ASTM C-114 Standard Test Methods for Chemical Analysis of Hydraulic Cement. All Sampling of fly ash will be in accordance with ASTM C-311 Standard Test Methods for Sampling and Testing Fly Ash or Natural Pozzolans for use as a Mineral Admixture in Portland Cement Concrete. The several following paragraphs provide further details as to measuring these characteristics of fly ash.

The fineness of fly ash may be determined by following specification C-430, incorporated herein by reference, and publicly available from ASTM International, 100 Barr Harbor Drive, P.O. Box C700, West Conshohocken, Pa. 19428-2959. By way of example, determination of fineness is according to ASTM C-430 Standard Test Method for Fineness of Hydraulic Cement by the No. 325 sieve as follows: weigh a 50 gram sample of fly ash, determine the amount of sample retained on a No. 325 sieve when wet-sieved, and calculate the fineness of the fly ash to the nearest 0.1%.

All references, publications and patents disclosed herein are expressly incorporated by reference. Also incorporated herein by reference, in their entirety, are Design and Control of Concrete Mixtures, 13$^{th}$ Ed., by Steven H. Kosmatka and William C. Panarese, published by the Portland Cement Association, and Ready-Mixed, by D. Gene Daniel and Colin L. Lobo, published by National Ready Mixed Concrete Association and ASTM International.

Thus, it is seen that the fly ash treatment system and method of use thereof of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention, as defined by the following claims.

What is claimed is:

1. A fly ash treatment system, comprising:
a chemical entity storage chamber;
a first fluid conduit attached to the chemical entity storage chamber;
a chemical pump attached to the first fluid conduit;
a control panel operationally attached to the chemical pump;
an ambient heater operationally attached to the control panel;

an in-line heater operationally attached to the control panel, wherein the in-line heater is attached to the first fluid conduit;

a second fluid conduit attached to the chemical entity storage chamber;

a valve attached to the second fluid conduit;

a third fluid conduit attached to the valve;

a first visual flow detector attached to the second fluid conduit;

a second visual flow detector attached to the third fluid conduit;

a totalizer attached to the third fluid conduit;

a chemical nozzle attached to the third fluid conduit;

a compressed air source operationally attached to the chemical nozzle.

2. The system of claim 1, wherein the chemical entity storage chamber is from about 125 gallons to about 500 gallons.

3. The system of claim 2, wherein the chemical pump further comprises a rate control device so that the rate of chemical flow is controlled to the 0.1 gallon per hour.

4. A chemical delivery system, comprising:

a chemical storage tank;

a chemical pump in fluid connection with the chemical storage tank;

a first plurality of fluid conduits attached to the chemical storage tank and the chemical pump, so that a chemical entity in the chemical storage tank is transported from the tank through the plurality of fluid conduits and back to the tank in order to provide constant circulation of the chemical entity;

a valve attached to the plurality of fluid conduits so that use of the valve results in the chemical entity being redirected for delivery;

a second plurality of fluid conduits attached to the valve;

a nozzle attached to each of the second plurality of fluid conduits;

a treatment chamber enclosing the nozzles, the treatment chamber having a conical shape, wherein the nozzles are recessed within a wide end of the conical shape of the treatment chamber; and an ash transportation pipe attached to the treatment chamber, wherein ash traveling through the transportation pipe receive the chemical entity from the nozzle and the chemical entity and ash interact during transportation therethrough.

5. The system of claim 4, further comprising a compressed air source so that the chemical entity passes through the nozzles at a predetermined PSI.

6. The system of claim 4, further comprising a first visual flow detector attached to the first plurality of fluid conduits.

7. The system of claim 6, further comprising a second visual flow detector attached to the second plurality of fluid conduits.

8. The system of claim 7, further comprising a chemical pump rate controller attached to the chemical pump.

9. The system of claim 8, wherein the chemical pump rate controller adjusts the rate of the chemical pump by adjustments as small as 0.1 gallons per hour.

10. The system of claim 9, further comprising a heater attached to the first plurality of fluid conduits so that the chemical entity is maintained at a desired temperature.

* * * * *